US012669772B2

(12) United States Patent
Morita et al.

(10) Patent No.: US 12,669,772 B2
(45) Date of Patent: Jun. 30, 2026

(54) IMAGE FORMING APPARATUS

(71) Applicant: KYOCERA Document Solutions Inc., Osaka (JP)

(72) Inventors: Takuro Morita, Osaka (JP); Takehiro Sato, Osaka (JP); Keiju Ishida, Osaka (JP); Sachio Izumichi, Osaka (JP); Kaori Katsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/082,036

(22) Filed: Mar. 17, 2025

(65) Prior Publication Data

US 2025/0298366 A1 Sep. 25, 2025

(30) Foreign Application Priority Data

Mar. 25, 2024 (JP) ................................ 2024-048173

(51) Int. Cl.

*G03G 21/16* (2006.01)
*G03G 15/00* (2006.01)
*G03G 15/20* (2006.01)

(52) U.S. Cl.

CPC ..... *G03G 21/1633* (2013.01); *G03G 15/2017* (2013.01); *G03G 15/80* (2013.01); *G03G 2221/1684* (2013.01)

(58) Field of Classification Search

CPC ........... G03G 21/1633; G03G 21/1647; G03G 21/1685; G03G 15/2017; G03G 2221/1684

See application file for complete search history.

(56) References Cited

U.S. PATENT DOCUMENTS

| | | | | |
|---|---|---|---|---|
| 2015/0071680 A1 | 3/2015 | Fukuda | | |
| 2021/0165352 A1 | 6/2021 | Sato | | |
| 2022/0373960 A1 | 11/2022 | Onishi | | |
| 2023/0195013 A1* | 6/2023 | Izumichi | ............ | G03G 15/2064 |
| 2023/0288848 A1* | 9/2023 | Sato | .................... | G03G 21/1685 |
| 2023/0288853 A1* | 9/2023 | Morita | ............... | G03G 15/2053 |

(Continued)

FOREIGN PATENT DOCUMENTS

JP 2021086093 A 6/2021

OTHER PUBLICATIONS

European Patent Office, Extended European Search Report Issued in Application No. 25164898.6, Aug. 13, 2025, Germany, 9 pages.

*Primary Examiner* — Carla J Therrien
(74) *Attorney, Agent, or Firm* — Alleman Hall LLP

(57) ABSTRACT

A movable member includes a second engagement portion that is engaged with a first engagement portion of a drawing port cover at a reference position when the drawing port cover is closed. One of the movable member and the drawing port cover has a slide surface. The other of the movable member and the drawing port cover includes a contact portion. In the process of the movement of the drawing port cover to a closed position, the movable member is moved to a retraction position by force applied by the contact portion sliding on the slide surface. When the drawing port cover is located at the closed position, the movable member is held at the reference position by biasing force of the second-direction biasing member and the drawing port cover is held at the closed position by engagement between the first engagement portion and the second engagement portion.

7 Claims, 11 Drawing Sheets

(56) References Cited

U.S. PATENT DOCUMENTS

| | | | | |
|---|---|---|---|---|
| 2023/0288854 | A1* | 9/2023 | Ishida ................ | G03G 15/2053 |
| 2024/0036510 | A1 | 2/2024 | Morita | |
| 2024/0353779 | A1* | 10/2024 | Izumichi ............ | G03G 15/2017 |
| 2025/0208561 | A1* | 6/2025 | Ishida ................ | G03G 15/2017 |

* cited by examiner

IMAGE FORMING APPARATUS

INCORPORATION BY REFERENCE

This application is based upon and claims the benefit of priority from the corresponding Japanese Patent Application No. 2024-048173 filed on Mar. 25, 2024, the entire contents of which are incorporated herein by reference.

BACKGROUND

This disclosure relates to an image forming apparatus including a fixing unit that is drawable from a body.

An electrophotographic image forming apparatus fixes a toner image onto a sheet with a fixing device.

The fixing device is sometimes divided into a fixing unit including a fixing member and a pressure roller, and a heating unit including a heater that heats the fixing member.

In addition, it has been known that the image forming apparatus includes a mechanism which moves the heating unit from a heating position to a retraction position in conjunction with an operation on an operation member. It is possible to draw the fixing unit out of the body when the heating unit is retracted to the retraction position.

SUMMARY

An image forming apparatus according to an aspect of this disclosure includes a body, a fixing unit, a drawing port cover, a cover supporting mechanism, a movable member, and a second-direction biasing member. The body has a side surface on which a drawing opening is formed. The fixing unit is disposed in the body. The fixing unit includes a fixing member that heats a toner image on a sheet conveyed in the body. The fixing unit is drawable from the body along a first direction through the drawing opening. The drawing port cover closes the drawing opening. The drawing port cover includes a first engagement portion that is engaged with a member in the body. The cover supporting mechanism supports the drawing port cover to allow the drawing port cover to pivot between a closed position at which the drawing opening is closed and an open position at which the drawing opening is opened. The movable member is disposed so as to be movable in the body along a second direction crossing the first direction. The movable member includes a second engagement portion that is engaged with the first engagement portion at a reference position in the second direction when the drawing port cover is closed. The movable member disengages the second engagement portion and the first engagement portion at a retraction position in the second direction. The second-direction biasing member biases the movable member toward the reference position along the second direction. One of the movable member and the drawing port cover has a slide surface inclined with respect to the first direction. Another of the movable member and the drawing port cover includes a contact portion that comes into contact with the slide surface when the drawing port cover is closed. The movable member is moved from the reference position to the retraction position against biasing force of the second-direction biasing member by force applied by the contact portion sliding on the slide surface in a process of movement of the drawing port cover from the open position to the closed position. When the drawing port cover is located at the closed position, the contact portion and the slide surface get out of contact, and the movable member is held at the reference position by the biasing force of the second-direction biasing member and the drawing port cover is held at the closed position by engagement between the first engagement portion and the second engagement portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of this disclosure will be described with reference to the drawings. It is to be noted that the following embodiment is a specific example of this disclosure and does not limit the technical scope of this disclosure.

Configuration of Image Forming Apparatus 10

An image forming apparatus 10 according to the embodiment executes a print process in an electrophotographic manner. The print process is a process of forming an image on a sheet.

Figure 1:
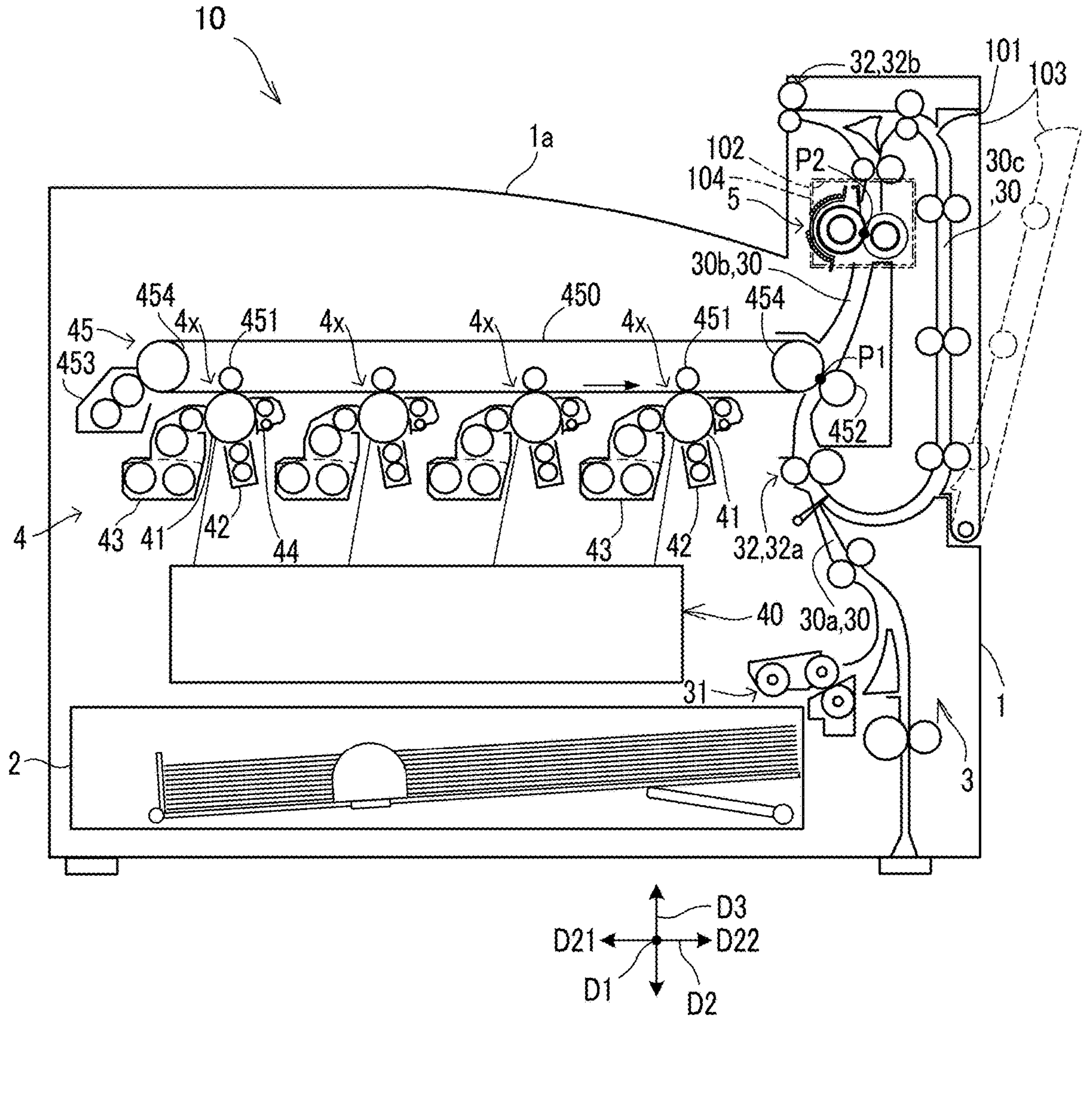
FIG. 1 is a configuration diagram of an image forming apparatus according to an embodiment.

As shown in FIG. 1, the image forming apparatus 10 includes a sheet storing portion 2, a sheet conveyance path 30, a sheet conveying device 3, and a printing device 4. The sheet conveying device 3 and the printing device 4 are housed in a body 1 that is a housing. The body 1 includes a body frame 1*x* that forms the framework of the body 1 and an exterior member attached to the body frame 1*x*.

The sheet storing portion 2 is capable of storing the sheet. The sheet conveyance path 30 is a path for the sheet disposed in the body 1. The sheet conveying device 3 includes a sheet feeding device 31 and a plurality of conveying roller pairs 32.

The sheet feeding device 31 feeds the sheets in the sheet storing portion 2 one by one to the sheet conveyance path 30. The sheet conveyance path 30 is disposed along a route extending through a transfer position P1 and a fixation position P2 in the body 1.

The plurality of conveying roller pairs 32 conveys the sheet along the sheet conveyance path 30. The plurality of conveying roller pairs 32 includes a registration roller pair 32*a* and a discharge roller pair 32*b*.

The registration roller pair 32*a* temporarily stops conveying the sheet and adjusts the timing of feeding the sheet to the transfer position P1. The discharge roller pair 32*b* discharges the sheet having an image formed thereon onto a discharge tray 1*a* from the sheet conveyance path 30.

The sheet conveyance path 30 includes a first conveyance path 30*a*, a second conveyance path 30*b*, and a third conveyance path 30*c* (see FIG. 1).

The first conveyance path 30*a* is a path extending from the position of the sheet feeding device 31 to the position preceding the registration roller pair 32*a*.

The second conveyance path 30*b* is a path that is continuous to the first conveyance path 30*a* and includes the position of the registration roller pair 32*a*, the transfer position P1, the fixation position P2, and the position of the discharge roller pair 32*b*.

The third conveyance path 30*c* is a path that branches off from a portion between the fixation position P2 and the position of the discharge roller pair 32*b* in the second conveyance path 30*b* and merges with a portion connected to the first conveyance path 30*a* in the second conveyance path 30*b*.

The third conveyance path 30*c* is a path for the sheet that is inverted and conveyed after passing through the fixation position P2. The third conveyance path 30*c* is a so-called inverting conveyance path. In a case where the sheet is conveyed along the third conveyance path 30*c*, the sheet is conveyed along the second conveyance path 30*b* again back to front and inside out.

The printing device 4 executes the print process on the sheet conveyed along the second conveyance path 30*b*. The image formed on the sheet is a toner image.

The printing device 4 includes a laser scanning unit 40, one or more image forming portions 4*x*, a transfer device 45, and a fixing device 5. The image forming portions 4*x* each include a photoconductor 41, a charging device 42, a developing device 43, and a drum cleaning device 44.

The charging device 42 charges a surface of the photoconductor 41. The laser scanning unit 40 scans the charged surface of the photoconductor 41 with beam light. The laser scanning unit 40 hereby forms an electrostatic latent image on the surface of the photoconductor 41.

The developing device 43 develops the electrostatic latent image on the surface of the photoconductor 41 into a toner image. The transfer device 45 transfers the toner image formed on the surface of the photoconductor 41 to the sheet.

In this embodiment, the printing device 4 is a tandem-type color printing device including the plurality of image forming portions 4*x*. In addition, the transfer device 45 includes an intermediate transfer belt 450, a plurality of primary transfer devices 451, a secondary transfer device 452, and a belt cleaning device 453.

In the example shown in FIG. 1, the printing device 4 includes the four image forming portions 4*x* corresponding to toners of the four colors of yellow, magenta, cyan, and black. The transfer device 45 includes the four primary transfer devices 451 corresponding to the four image forming portions 4*x*.

The intermediate transfer belt 450 is supported by a plurality of support rollers 454 so as to be rotatable. One of the plurality of support rollers 454 is driven to rotate by an unillustrated belt driving device. This rotates the intermediate transfer belt 450.

The respective primary transfer devices 451 transfer the toner images formed on the surfaces of the photoconductors 41 to a surface of the intermediate transfer belt 450 in the respective image forming portions 4*x*. This forms, on the surface of the intermediate transfer belt 450, a composite toner image in which the toner images of the four colors are combined.

The intermediate transfer belt 450 rotates while carrying the composite toner image. The secondary transfer device 452 transfers the composite toner image on the surface of the intermediate transfer belt 450 to the sheet at the transfer position P1.

The drum cleaning device 44 removes waste toner from the surface of the photoconductor 41. The belt cleaning device 453 removes waste toner from the surface of the intermediate transfer belt 450.

The fixing device 5 is disposed at the fixation position P2 in the sheet conveyance path 30 in the body 1. The fixation position P2 is a position on the downstream side of the transfer position P1 in the sheet conveyance direction.

The fixing device 5 pressurizes the composite toner image on the sheet at the fixation position P2 while heating the composite toner image. The fixing device 5 hereby fixes the composite toner image onto the sheet.

Figure 2:
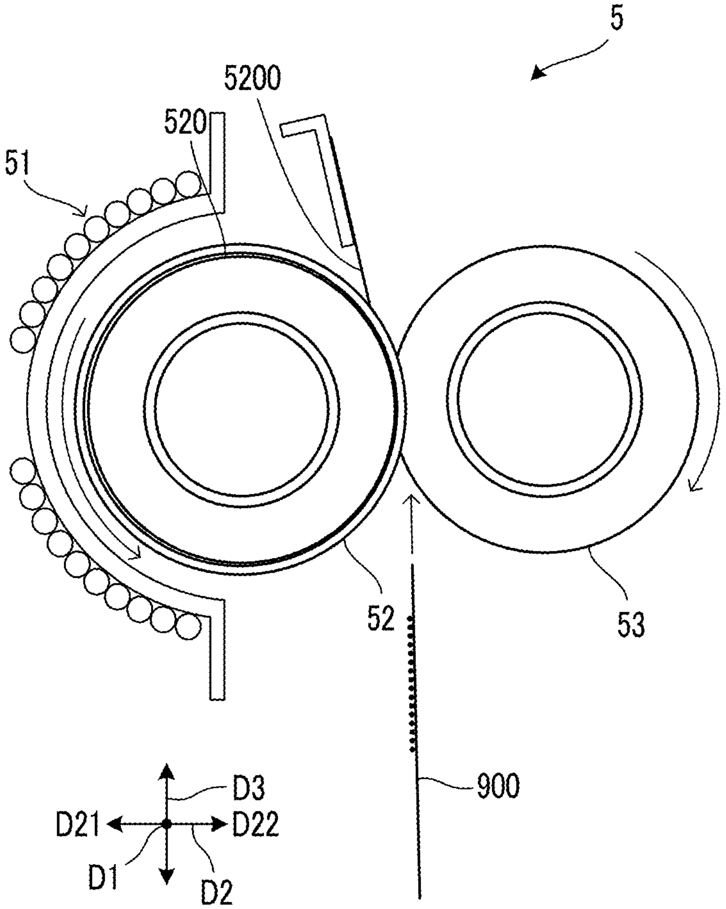
FIG. 2 is a diagram showing part of a configuration of a fixing device in the image forming apparatus according to the embodiment.

As shown in FIG. 2, the fixing device 5 includes a heater 51, a fixing belt 52, a fixing roller 520, a pressure roller 53, and a sheet separating member 5200.

The fixing belt 52 is a flexible cylindrical member having the fixing roller 520 therein. The fixing belt 52 is heated by the heater 51 and also heats the toner image on the sheet passing through the fixation position P2.

The fixing roller 520 is a cylindrical member that supports the fixing belt 52 inside the fixing belt 52. The fixing roller 520 is supported so as to be rotatable. The fixing belt 52 is rotatable along with the fixing roller 520.

The fixing belt 52 includes an electrically conductive base member, an elastic layer formed on the outer periphery of the base member, and a release layer formed on the outer periphery of the elastic layer.

The heater 51 is disposed to be opposed to the outer peripheral surface of the fixing belt 52. In this embodiment, the heater 51 is an electromagnetic induction heating device. The heater 51 heats chiefly the base member of the fixing belt 52 by electromagnetic induction.

The pressure roller 53 is supported so as to be rotatable. The pressure roller 53 is driven and rotated by an unillustrated drive device. The fixing belt 52 and the fixing roller 520 rotate in conjunction with the pressure roller 53.

The fixing belt 52 heats the toner image formed on the sheet. The pressure roller 53 pressurizes the toner image toward the sheet by biasing the sheet to the fixing belt 52.

It is to be noted that the fixing belt 52 is an example of a fixing member which is heated by the heater 51 and heats the toner image on the sheet. The pressure roller 53 is an example of a pressure member that biases the sheet to the fixing belt 52.

The sheet separating member 5200 peels the sheet from the fixing belt 52 when the sheet adheres to the fixing belt 52.

In a case where the print process is executed on one of the sides of the sheet, the sheet conveying device 3 executes a first conveyance process, a second conveyance process, and a discharge process. The first conveyance process is a process of conveying the sheet in the sheet storing portion 2 along the first conveyance path 30*a*. The second conveyance process is a process of conveying the sheet along the second conveyance path 30*b*. The discharge process is a process of discharging the sheet onto the discharge tray 1*a* from the second conveyance path 30*b*.

In a case where the print processes are executed on both sides of the sheet, the sheet conveying device 3 executes the first conveyance process, the second conveyance process, and the third conveyance process and then executes the second conveyance process and the discharge process. The third conveyance process is a process of inverting the sheet in the second conveyance path 30*b* and further conveying the sheet along the third conveyance path 30*c*.

Figure 4:
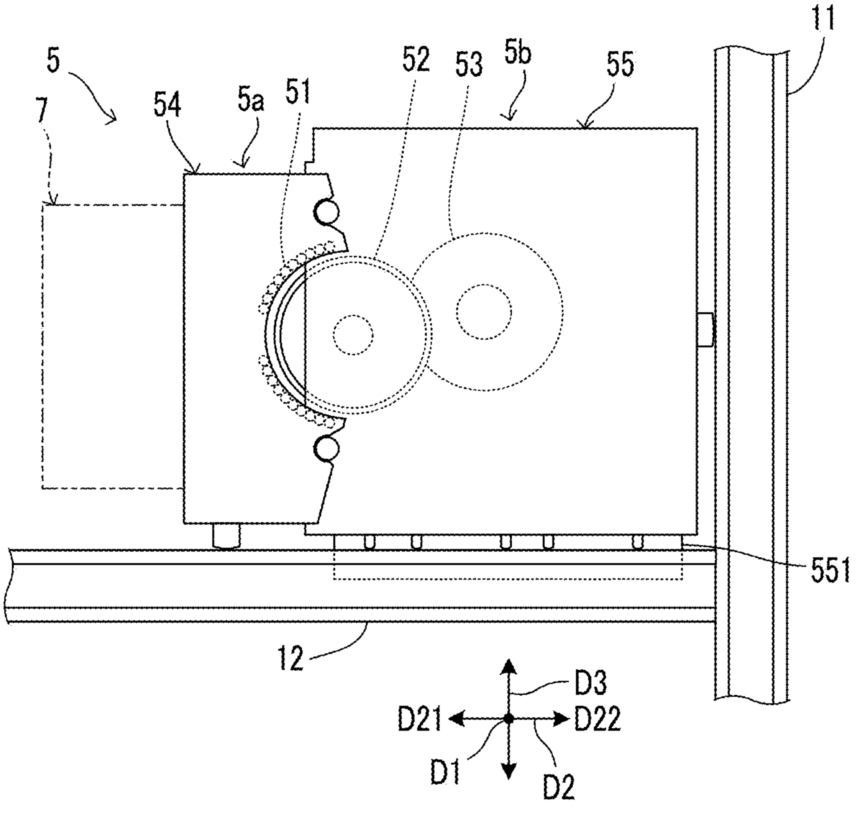
FIG. 4 is a front view of the fixing device in a proximity state in the image forming apparatus according to the embodiment.
Figure 5:
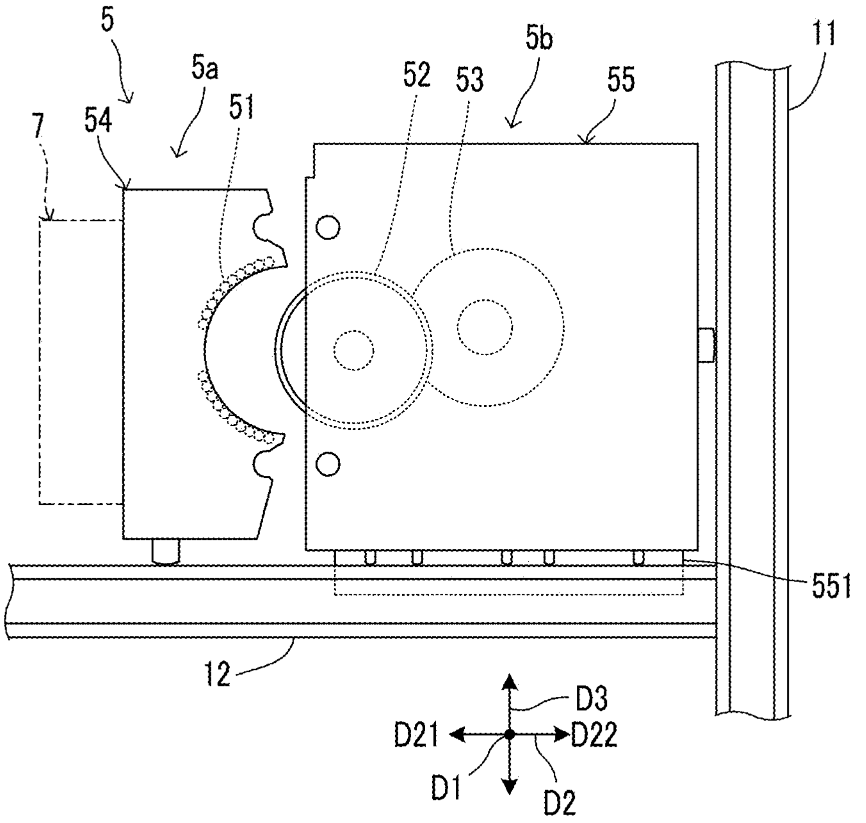
FIG. 5 is a front view of the fixing device in a separated state in the image forming apparatus according to the embodiment.

In this embodiment, the fixing device 5 is divided into a heating unit 5*a* and a fixing unit 5*b* (see FIGS. 4 and 5). The heating unit 5*a* is disposed along a first direction D1 in the body 1. The fixing unit 5*b* is also disposed along the first direction D1 in the body 1.

That is, the heating unit 5*a* and the fixing unit 5*b* are disposed with the respective longitudinal directions thereof along the first direction D1.

The heating unit 5*a* and the fixing unit 5*b* are disposed side by side in the second direction D2. That is, the second direction D2 is the arrangement direction of the heating unit 5*a* and the fixing unit 5*b*. The second direction D2 is a direction crossing the first direction D1.

In the following description, one of the sides in the second direction D2 will be referred to as a first side D21 and the other side in the second direction D2 will be referred to as a second side D22 (see FIGS. 3 to 5, 7, and 8). The heating unit 5*a* is disposed on the first side D21 with respect to the fixing unit 5*b* (see FIGS. 4, 5, 7, and 8).

The heating unit 5*a* includes the heater 51 and a first support 54. The fixing unit 5*b* includes the fixing belt 52, the fixing roller 520, the pressure roller 53, and a second support 55.

The first support 54 is a member that supports the heater 51. The second support 55 is a member that supports the fixing belt 52, the fixing roller 520, and the pressure roller 53. The fixing belt 52 is supported by the second support 55 through the fixing roller 520.

Figure 3:
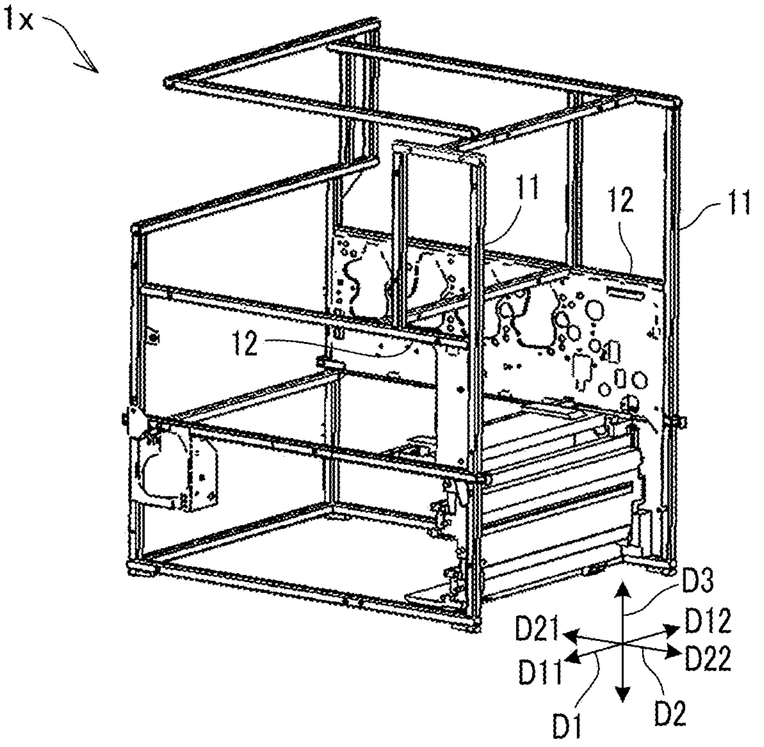
FIG. 3 is a perspective view of a body frame in the image forming apparatus according to the embodiment.

The body frame 1*x* includes a combination of a plurality of metal pipes (see FIG. 3). The heating unit 5*a* and the fixing unit 5*b* are supported by the body frame 1*x*. The fixing unit 5*b* is disposed on the first side D21 of the heating unit 5*a* in the second direction D2.

The plurality of metal pipes included in the body frame 1*x* includes lateral support portions 11 and lower support portions 12 (see FIGS. 3 to 5).

In this embodiment, the lateral support portions 11 are two support pipes formed to extend in a vertical direction D3 and disposed in the first direction D1 at an interval (see FIG. 3). The vertical direction D3 is the up-down direction.

The lower support portions 12 are two beam pipes formed to extend in the second direction D2 below the heating unit 5*a* and the fixing unit 5*b* and disposed in the first direction D1 at an interval (see FIG. 3).

Figure 7:
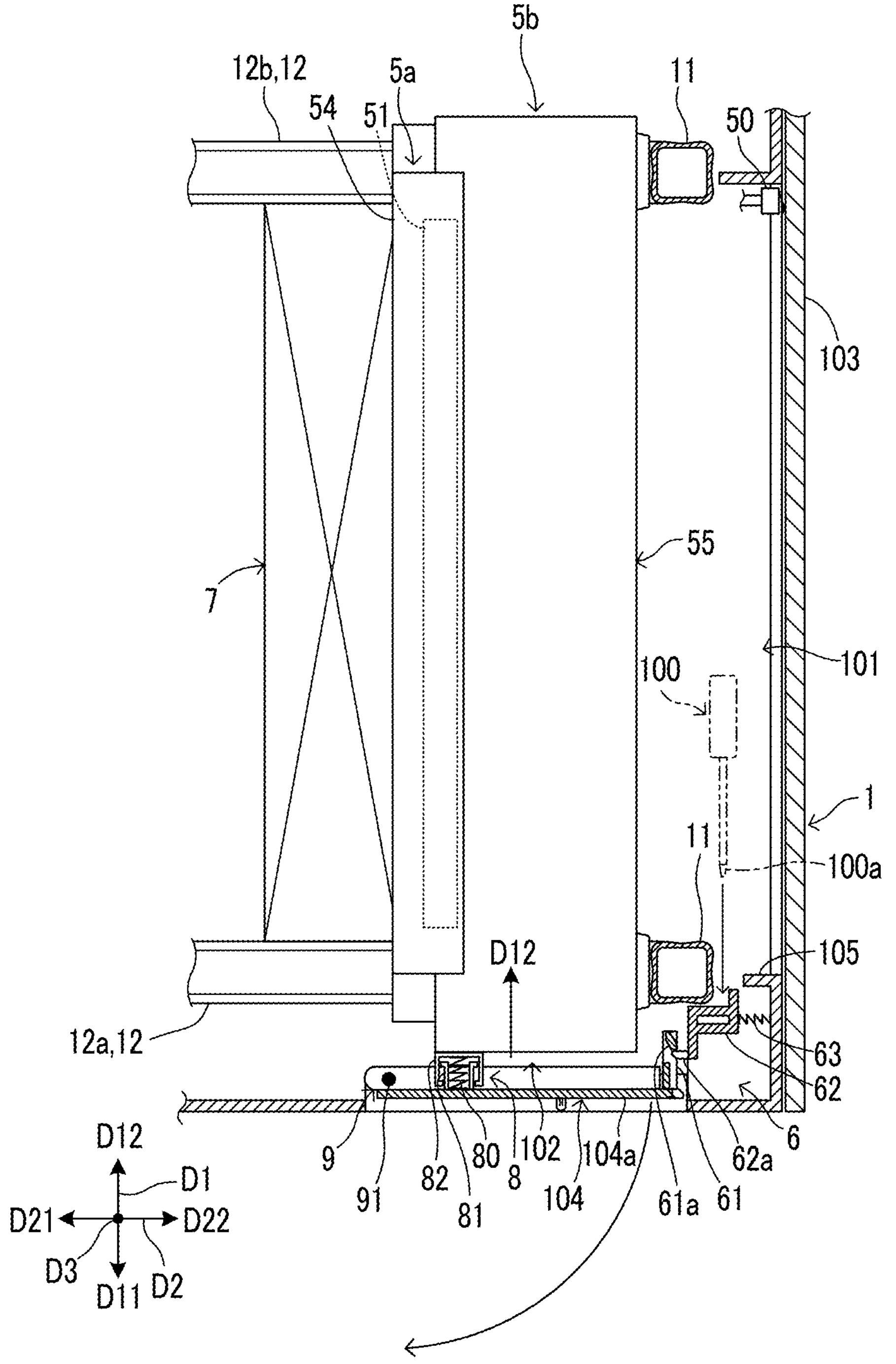
FIG. 7 is a plan cross-sectional view of a portion around the fixing unit in the image forming apparatus according to the embodiment with a second cover closed.
Figure 8:
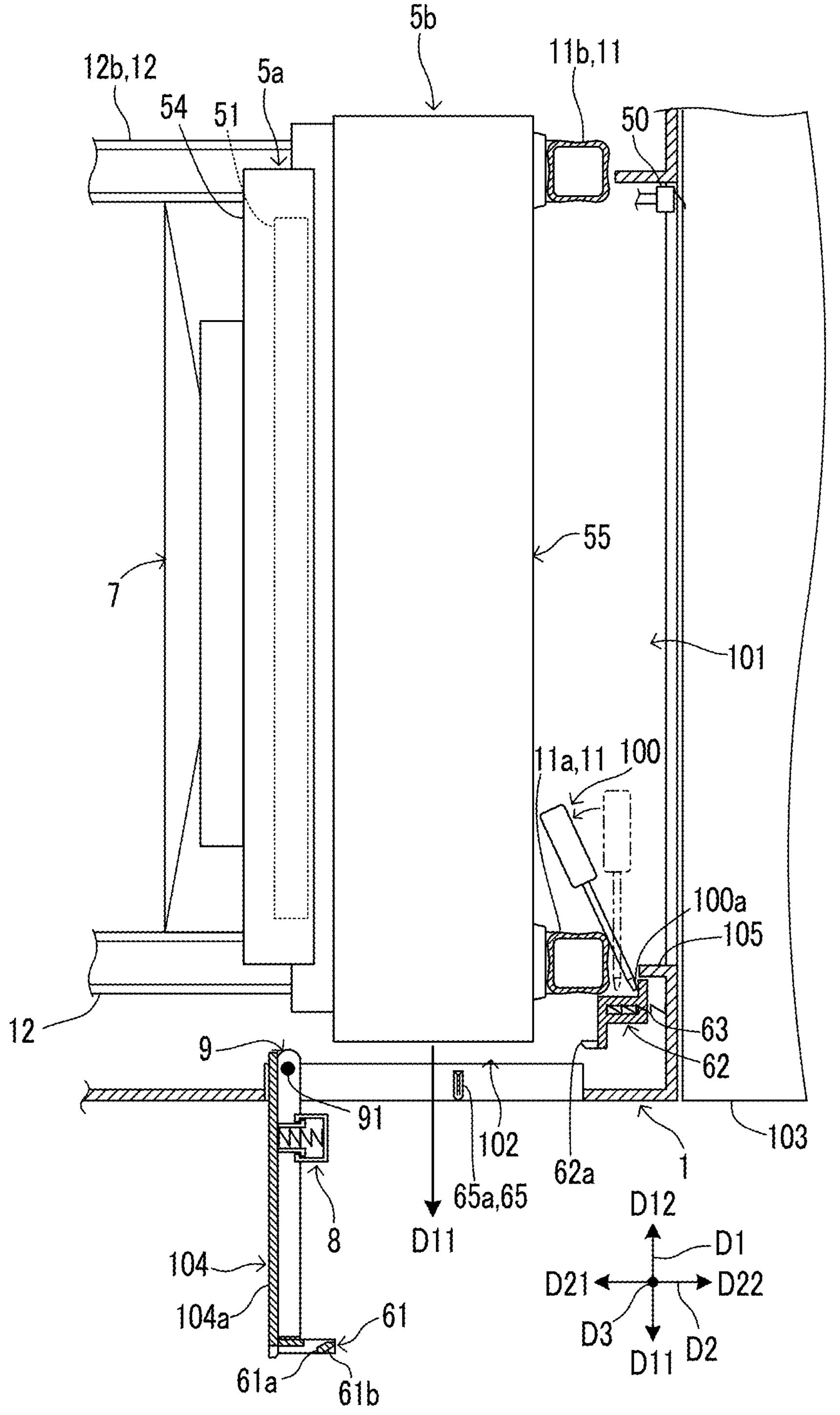
FIG. 8 is a plan cross-sectional view of the portion around the fixing unit in the image forming apparatus according to the embodiment with the second cover opened.
Figure 9:
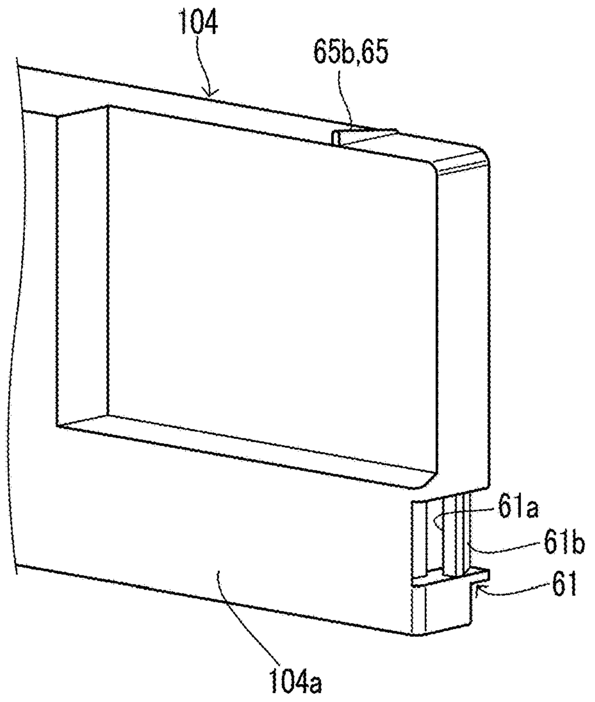
FIG. 9 is a perspective view of part of the second cover in the image forming apparatus according to the embodiment.

The heating unit 5*a* and the fixing unit 5*b* are placed on the lower support portions 12 with the respective longitudinal directions thereof along the first direction D1 (see FIGS. 7 and 8). That is, the lower support portions 12 each support the heating unit 5*a* and fixing unit 5*b* from below.

The heating unit 5*a* and the fixing unit 5*b* are movable on the lower support portions 12 along the second direction D2. The fixing unit 5*b* is disposed between the heating unit 5*a* and the lateral support portions 11 (see FIGS. 4 and 5).

The heating unit 5*a* is moved to a position apart from the fixing unit 5*b* to allow the fixing unit 5*b* to be drawn out of the body 1 along the first direction D1 (see FIGS. 5 and 8).

The body 1 has a first opening 101 and a second opening 102 formed in a direction different from the direction of the first opening 101 (see FIGS. 1, 7, and 8). The first opening 101 is formed on a first side surface that is one of the side surfaces of the body 1 in the four directions. The second opening 102 is formed on a second side surface that is another side surface of the side surfaces of the body 1 in the four directions.

The first side surface is a surface at an end of the body 1 in the first direction D1 and the second side surface is a side surface at an end of the body 1 in the second direction D2. The second side surface is an example of a side surface of the body 1 that is different from the side surface on which the first opening 101 is formed.

The first opening 101 is an example of a specific opening and a first cover 103 is an example of a specific cover that allows the specific opening to be opened and closed.

In this embodiment, the first opening 101 is formed on the side surface of the body 1 closer to the second side D22 in the second direction D2 and the second opening 102 is formed on the front surface of the body 1 (see FIG. 1).

The image forming apparatus 10 includes the first cover 103 that allows the first opening 101 to be opened and closed, and a second cover 104 that allows the second opening 102 to be opened and closed (see FIG. 1).

The first cover 103 is opened to open part of the sheet conveyance path 30 to the outside of the body 1. In this embodiment, the first cover 103 is opened to open the third conveyance path 30*c* to the outside of the body 1 (see FIG. 1).

The second cover 104 is opened to open an end of the fixing unit 5*b* in the first direction D1 to the outside of the body 1 (see FIG. 8).

Incidentally, the fixing device 5 has high temperature. It is therefore desirable to allow a user to refrain from inadvertently drawing the fixing unit 5*b* out of the body 1.

The image forming apparatus 10 includes a component that prevents a user from inadvertently drawing the fixing unit 5*b* out of the body 1. A component that attaches and detaches the fixing unit 5*b* in the image forming apparatus 10 will be described below.

The second cover 104 is supported by a cover supporting mechanism 9 so as to be pivotable (see FIGS. 7 and 8). The second cover 104 is pivotable around a spindle portion 91 of the cover supporting mechanism 9.

The cover supporting mechanism 9 supports the second cover 104 to allow the second cover 104 to pivot between a closed position and an open position. The closed position is the position of the second cover 104 at which the second cover 104 closes the second opening 102 (see FIG. 7). The open position is the position of the second cover 104 at which the second cover 104 opens the second opening 102 (see FIG. 8).

FIG. 7 shows the second cover 104 located at the closed position and the fixing device 5. FIG. 8 shows the second cover 104 located at the open position and the fixing device 5.

The image forming apparatus 10 includes a separation and approach mechanism 7 that brings the heating unit 5*a* closer to the fixing unit 5*b* or separates the heating unit 5*a* from the fixing unit 5*b* (see FIGS. 4, 5, 7, and 8). Furthermore, the image forming apparatus 10 includes a unit biasing mechanism 8, a switch 50, and a latch mechanism 6 (see FIGS. 7 and 8).

Separation and Approach Mechanism 7

The separation and approach mechanism 7 moves the heating unit 5*a* along the second direction D2 in response to an operation on an unillustrated operation lever.

The separation and approach mechanism 7 moves the heating unit 5*a* closer to the second side D22 in response to a first lever operation of moving the operation lever in a first predefined direction (see FIG. 7). Meanwhile, the separation and approach mechanism 7 moves the heating unit 5*a* closer to the first side D21 in response to a second lever operation of moving the operation lever in a second predefined direction (see FIG. 8).

It is to be noted that the second cover 104 may also serve as the operation lever. In a case where the second cover 104 also serves as the operation lever, the first lever operation is an operation of moving the second cover 104 from the open position to the closed position and the second lever operation is an operation of moving the second cover 104 from the closed position to the open position.

The separation and approach mechanism 7 moves the heating unit 5*a* closer to the second side D22 to cause the fixing unit 5*b* and the heating unit 5*a* to be sandwiched between the separation and approach mechanism 7 and the lateral support portions 11 (see FIGS. 4 and 7). The heating unit 5*a* is hereby held at a proximity position at which the heating unit 5*a* is close to the fixing unit 5*b*.

FIG. 7 shows a biasing state in which the separation and approach mechanism 7 is biasing the heating unit 5*a* and the fixing unit 5*b* toward the lateral support portions 11. FIGS. 4 and 7 each show the fixing device 5 in the proximity state in which the separation and approach mechanism 7 is holding the heating unit 5*a* close to the fixing unit 5*b*.

The fixing unit 5*b* and the heating unit 5*a* are positioned in the second direction D2 by being sandwiched between the separation and approach mechanism 7 and the lateral support portions 11.

In contrast, the separation and approach mechanism 7 moves the heating unit 5*a* closer to the first side D21 to move the heating unit 5*a* to a separated position closer to the first side D21 apart from the fixing unit 5*b*.

FIG. 8 shows the fixing device 5 in a separated state. The separated state is a state in which the heating unit 5*a* is located at the separated position. When the heating unit 5*a* is located at the separated position, it is possible to draw out the fixing unit 5*b* in a drawing direction D11 (see FIG. 8).

Unit Biasing Mechanism

Figure 6:
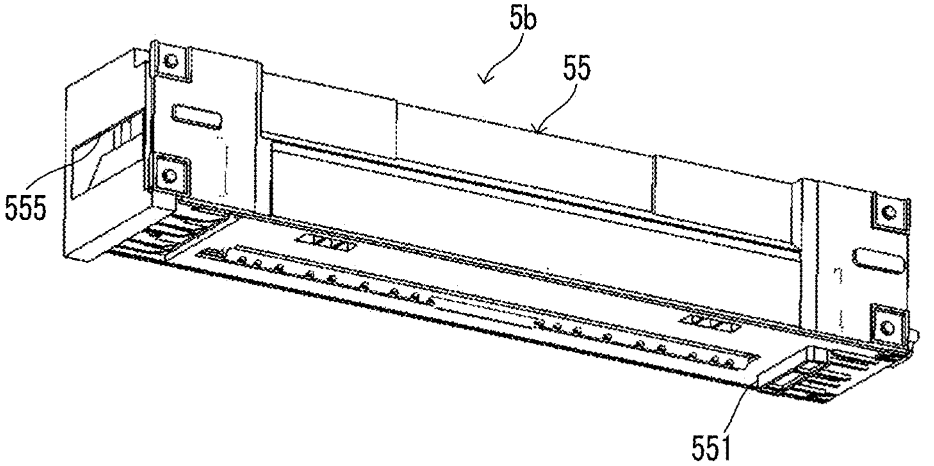
FIG. 6 is a perspective view of a fixing unit in the image forming apparatus according to the embodiment.

The image forming apparatus 10 further includes the unit biasing mechanism 8 attached to the inner surface of the second cover 104 (see FIGS. 7 and 8). In addition, the second support 55 of the fixing unit 5*b* includes a protruding portion 551 that projects from the lower surface of the second support 55 (see FIGS. 4 to 6).

The unit biasing mechanism 8 includes a spring 80, a spring case 81, and a cap portion 82 (see FIG. 7).

The spring case 81 houses the spring 80. The cap portion 82 is movably attached to the spring case 81. The spring 80 is an example of an elastic member.

The spring 80 is sandwiched between the second cover 104 and the second support 55 of the fixing unit 5*b* when the second cover 104 is located at the closed position. In this embodiment, the spring 80 and the cap portion 82 are sandwiched between the second cover 104 and the second support 55.

The spring 80 is sandwiched between the second cover 104 and the second support 55 to bias the second support 55 in a mounting direction D12 with elastic force (see FIG. 7). The mounting direction D12 is the direction opposite to the drawing direction D11 of the fixing unit 5*b*. The drawing direction D11 and the mounting direction D12 are directions along the first direction D1.

Force received by the second support 55 from the spring 80 when the second cover 104 is located at the closed position causes the protruding portion 551 to abut the lower support portions 12.

The fixing unit 5*b* is positioned in the first direction D1 by the action of the spring 80 and the protruding portion 551. It is to be noted that the unit biasing mechanism 8 may be attached to the surface of the fixing unit 5*b* opposed to the second cover 104.

That is, the unit biasing mechanism 8 is disposed on the inner surface of the second cover 104 or the surface of the fixing unit 5*b* opposed to the second cover 104. When the second cover 104 is closed, the spring 80 of the unit biasing mechanism 8 biases the fixing unit 5*b* to the lower support portions 12 of the body 1 to hold the fixing unit 5*b* at a mounting position in the first direction D1. The spring 80 is an example of a first-direction biasing member.

Switch 50

The state of the switch 50 is switched in response to an operation of the first cover 103 (see FIGS. 7 and 8).

The switch 50 electrically disconnects a power supply line for the heater 51 of the heating unit 5*a* by the first cover 103 being opened. In contrast, the switch 50 makes the power supply line electrically conductive by the first cover 103 being closed.

The first cover 103 is opened to open part of the sheet conveyance path 30. In this embodiment, the first cover 103 is opened to open the third conveyance path 30*c* (see FIG. 1). The switch 50 is provided to serve as a safeguard when the first cover 103 is opened.

Latch Mechanism 6

The latch mechanism 6 is a mechanism that latches the second cover 104 at the closed position (see FIG. 7). It is possible for the latch mechanism 6 to unlatch the second cover 104 latched at the closed position (see FIG. 8). The second cover 104 latched at the closed position is unlatched and it is thus possible for the second cover 104 to pivot from the closed position to the open position.

When the second cover 104 is located at the open position, it is possible to draw the fixing unit 5*b* out of the body 1 in the drawing direction D11 through the second opening 102 (see FIG. 8).

The second opening 102 is an example of a drawing opening for drawing out the fixing unit 5*b*. The second cover 104 is an example of a drawing port cover that closes the drawing opening.

The second cover 104 includes a cover base 104*a* and an inner projecting portion 61 (see FIGS. 7 and 10 to 12). The cover base 104*a* is a portion that closes the second opening 102. The inner projecting portion 61 is a portion that projects to the inside of the body 1 from the cover base 104*a*. The inner projecting portion 61 is included in part of the latch mechanism 6.

The latch mechanism 6 includes the inner projecting portion 61, a movable member 62, and a spring 63 (see FIGS. 7, 8, and 10 to 12). The movable member 62 and the spring 63 are disposed in the body 1. The inner projecting portion 61 includes a first engagement portion 61*a* and a slide surface 61*b* (see FIGS. 7 to 12). The movable member 62 includes a second engagement portion 62*a* and a contact portion 62*b* (see FIGS. 7, 8, and 10 to 12).

Figure 12:
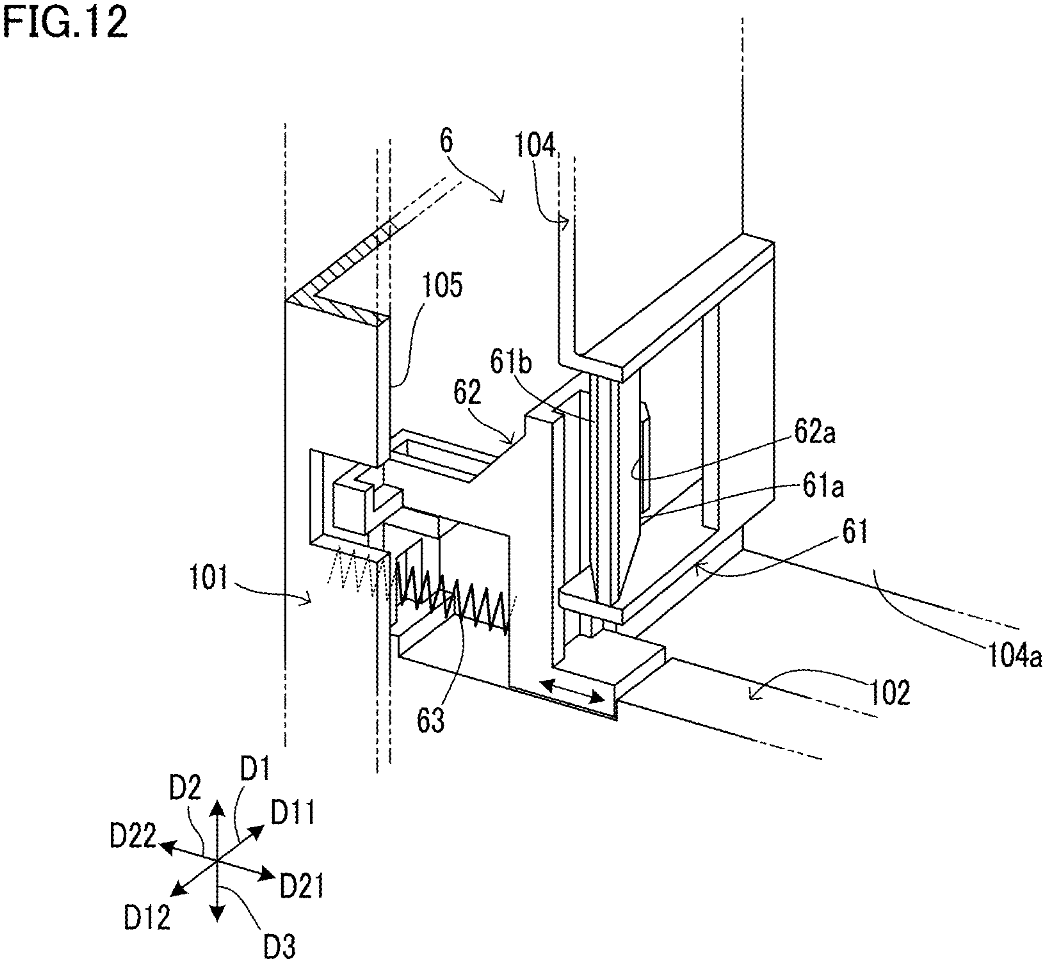
FIG. 12 is a second perspective view of the part of the second cover and the latch mechanism in the image forming apparatus according to the embodiment (with the inner projecting portion of the second cover latched by the movable member).

The first engagement portion 61*a* of the inner projecting portion 61 is engaged with the second engagement portion 62*a* of the movable member 62 when the second cover 104 is closed (see FIGS. 7 and 12).

Figure 10:
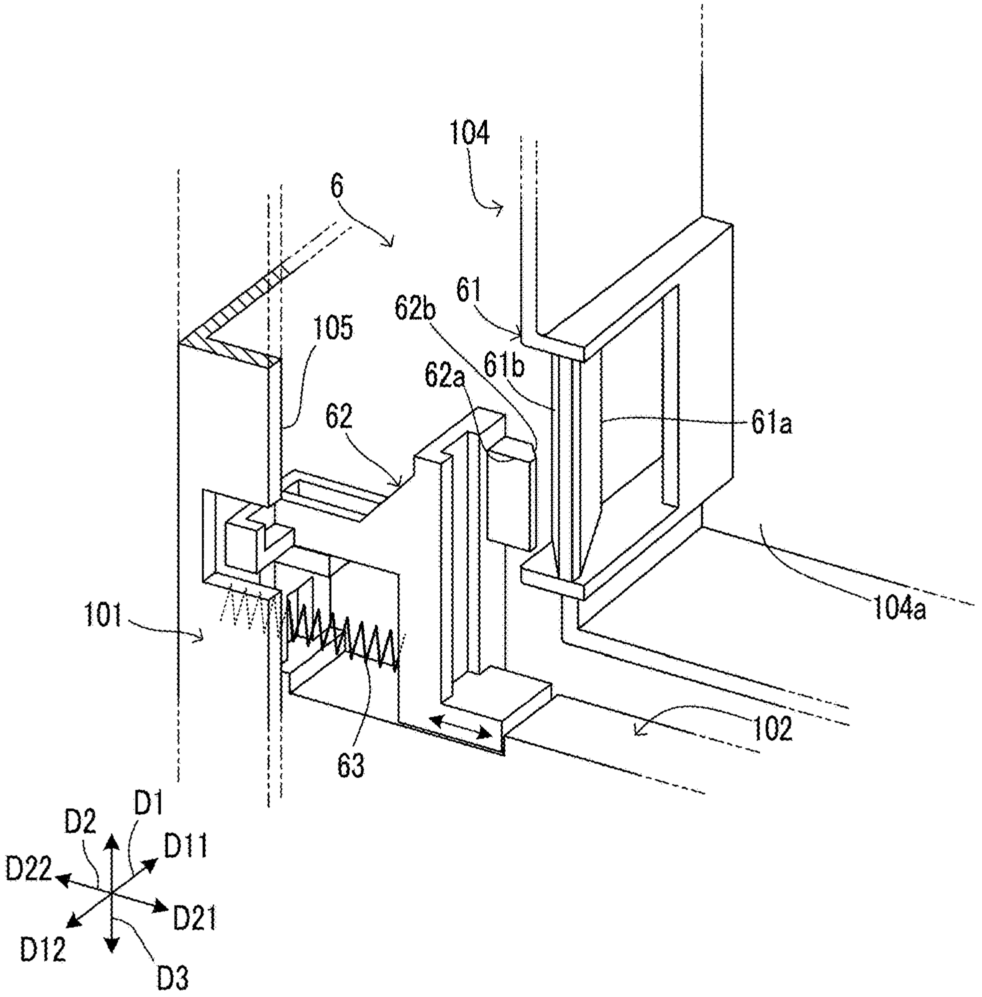
FIG. 10 is a first perspective view of the part of the second cover and a latch mechanism in the image forming apparatus according to the embodiment (with an inner projecting portion of the second cover apart from a movable member).

The movable member 62 is disposed so as to be movable in the body 1 along the second direction D2. The movable member 62 is movable between a reference position and a retraction position in the second direction D2. FIGS. 7, 10, and 12 each show that the movable member 62 is located at the reference position. FIG. 8 shows that the movable member 62 is located at the retraction position.

When the movable member 62 is located at the reference position with the second cover 104 closed, the second engagement portion 62*a* is engaged with the first engagement portion 61*a*. FIGS. 7 and 12 each show that the second engagement portion 62*a* is engaged with the first engagement portion 61*a*.

In contrast, when the movable member 62 is located at the retraction position, the movable member 62 disengages the second engagement portion 62*a* and the first engagement portion 61*a*. FIG. 8 shows that the second engagement portion 62*a* and the first engagement portion 61*a* are disengaged.

When the movable member 62 is moved from the reference position to the retraction position, the second cover 104 is automatically pivoted by the biasing force of the spring 80 in the direction from the closed position to the open position.

The spring 63 biases the movable member 62 toward the reference position along the second direction D2. The spring 63 is an example of a second-direction biasing member.

The slide surface 61*b* is a surface inclined with respect to the first direction D1. The contact portion 62*b* comes into contact with the slide surface 61*b* when the second cover 104 is closed (see FIG. 11). In the process of the movement of the second cover 104 from the open position to the closed position, the contact portion 62*b* slides on the slide surface 61*b*.

Figure 11:
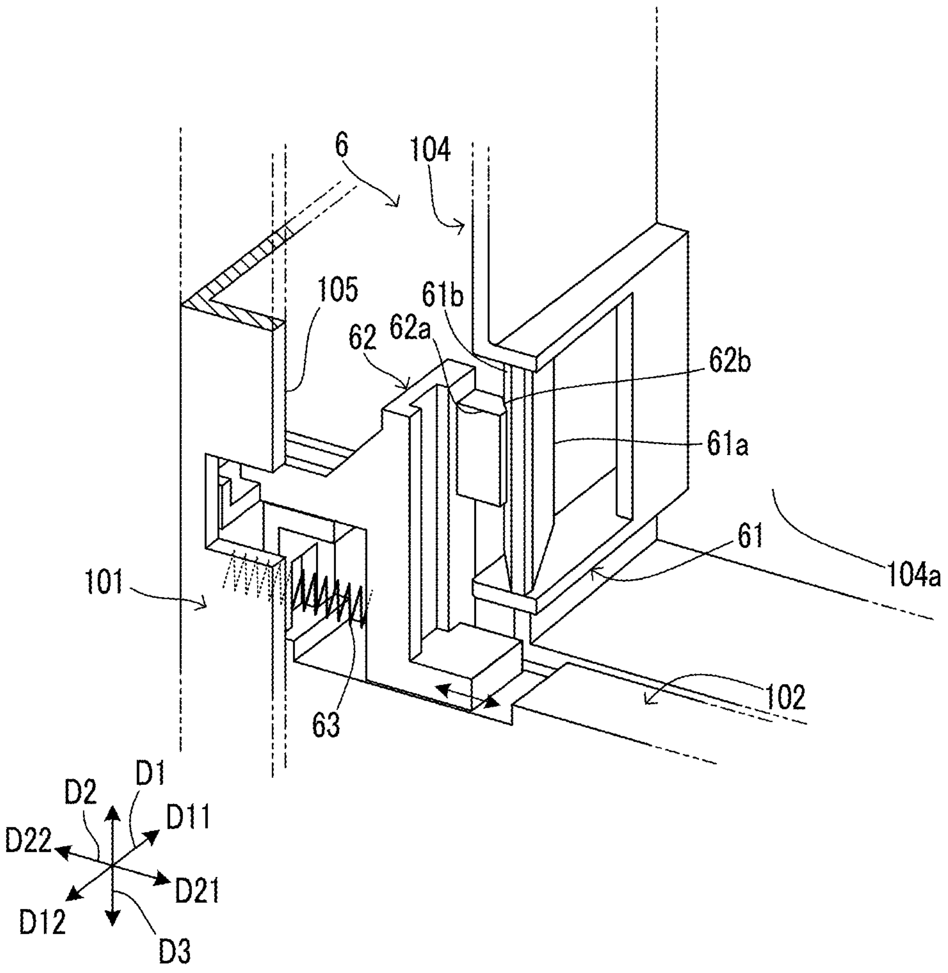
FIG. 11 is a second perspective view of the part of the second cover and the latch mechanism in the image forming apparatus according to the embodiment (immediately before the inner projecting portion of the second cover is latched by the movable member).

When the second cover 104 is moved to the closed position, the movable member 62 is moved from the reference position to the retraction position against the biasing force of the spring 63 by force applied by the contact portion 62*b* sliding on the slide surface 61*b*. FIG. 11 shows that the movable member 62 is moved toward the retraction position by force applied by the contact portion 62*b* sliding on the slide surface 61*b*.

When the second cover 104 is located at the closed position, the contact portion 62*b* and the slide surface 61*b* get out of contact. This causes the movable member 62 to be held at the reference position by the biasing force of the spring 63 and causes the second cover 104 to be held at the closed position by the engagement between the first engagement portion 61*a* and the second engagement portion 62*a*. That is, the latch mechanism 6 latches the second cover 104 at the closed position with the engagement between the first engagement portion 61*a* and the second engagement portion 62*a*.

In contrast, an operation of moving the movable member 62 from the reference position to the retraction position disengages the first engagement portion 61*a* and the second engagement portion 62*a* (see FIG. 8). That is, unless the movable member 62 is moved to the retraction position, the second cover 104 latched by the latch mechanism 6 is not unlatched. This makes it possible to prevent a user from inadvertently drawing the fixing unit 5*b* out of the body 1.

In the latch mechanism 6, the inner projecting portion 61 is configured to have strength enough to refrain from being elastically deformed by the biasing force of the spring 63. That is, the latch mechanism 6 does not adopt a so-called snap-fit that uses the elastic deformation of the inner projecting portion 61. The latch mechanism 6 therefore has high durability and allows the second cover 104 to be latched at the closed position more reliably.

The movable member 62 is disposed at a position accessible from the first opening 101 in the body 1 (see FIGS. 7 and 8). The first cover 103 thus blocks an access route from the outside of the body 1 to the movable member 62 by closing the first opening 101.

It is not thus possible to unlatch the second cover 104 latched by the latch mechanism 6 without opening the first cover 103. This more reliably prevents a user from inadvertently drawing the fixing unit 5*b* out of the body 1.

The image forming apparatus 10 further includes an access limiting portion 105 (see FIGS. 7, 8, and 11 to 13). The access limiting portion 105 limits the size of an access route from the first opening 101 to the movable member 62.

Specifically, the access limiting portion 105 limits the access route in size such that no finger is allowed to be inserted. The access limiting portion 105 forms the access route that allows a front end 100*a* of a bar-shaped portion of a tool 100 such as a screw driver to be inserted thereto (see FIGS. 7 and 8).

The tool 100 is moved with the front end 100*a* of the tool 100 inserted to the access route to move the movable member 62 from the reference position to the retraction position with force received from the tool 100.

The access limiting portion 105 prevents a user from inadvertently operating the movable member 62 with a finger.

Cover Supporting Mechanism 9

Figure 13:
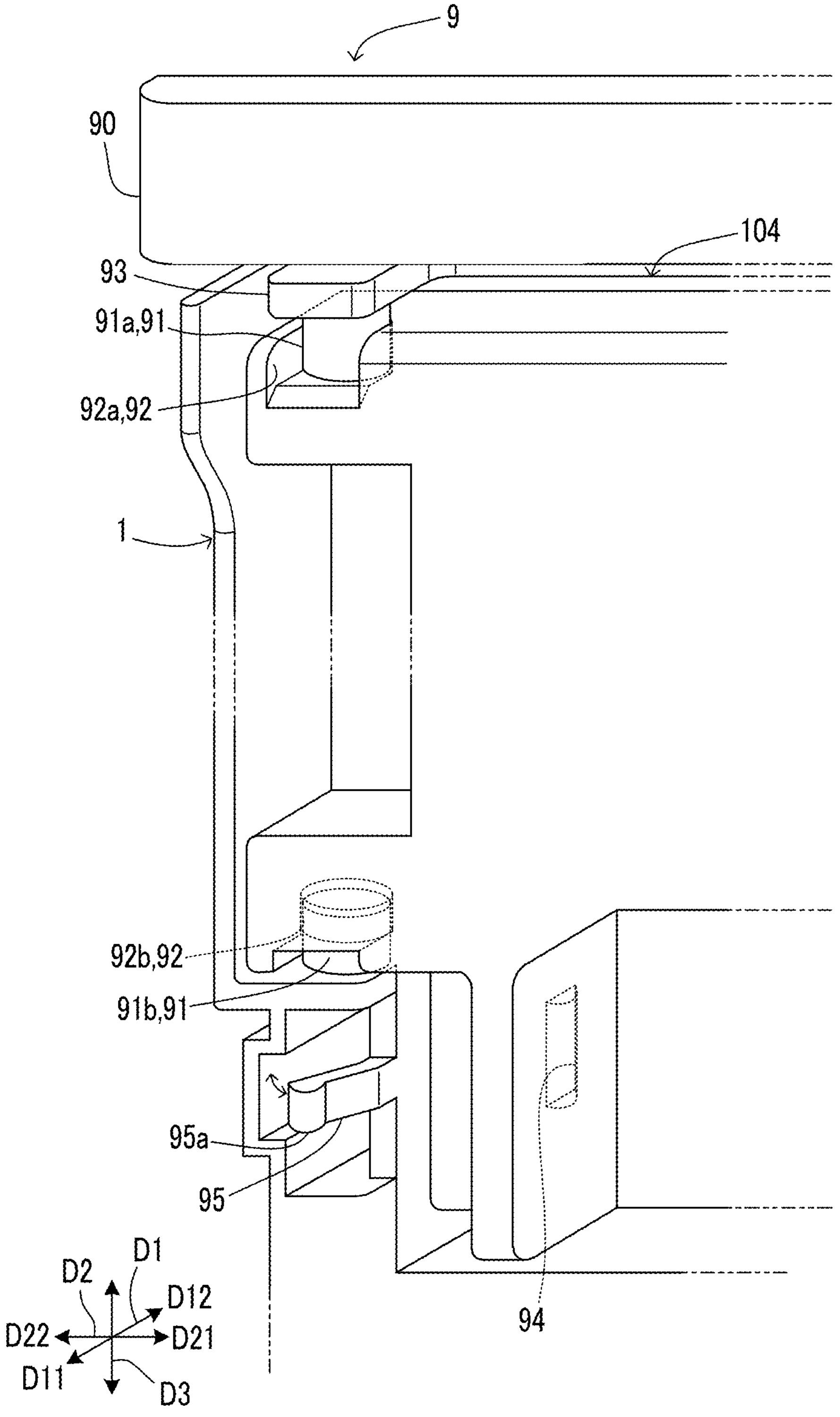
FIG. 13 is a perspective view of a cover supporting mechanism in the image forming apparatus according to the embodiment.
Figure 14:
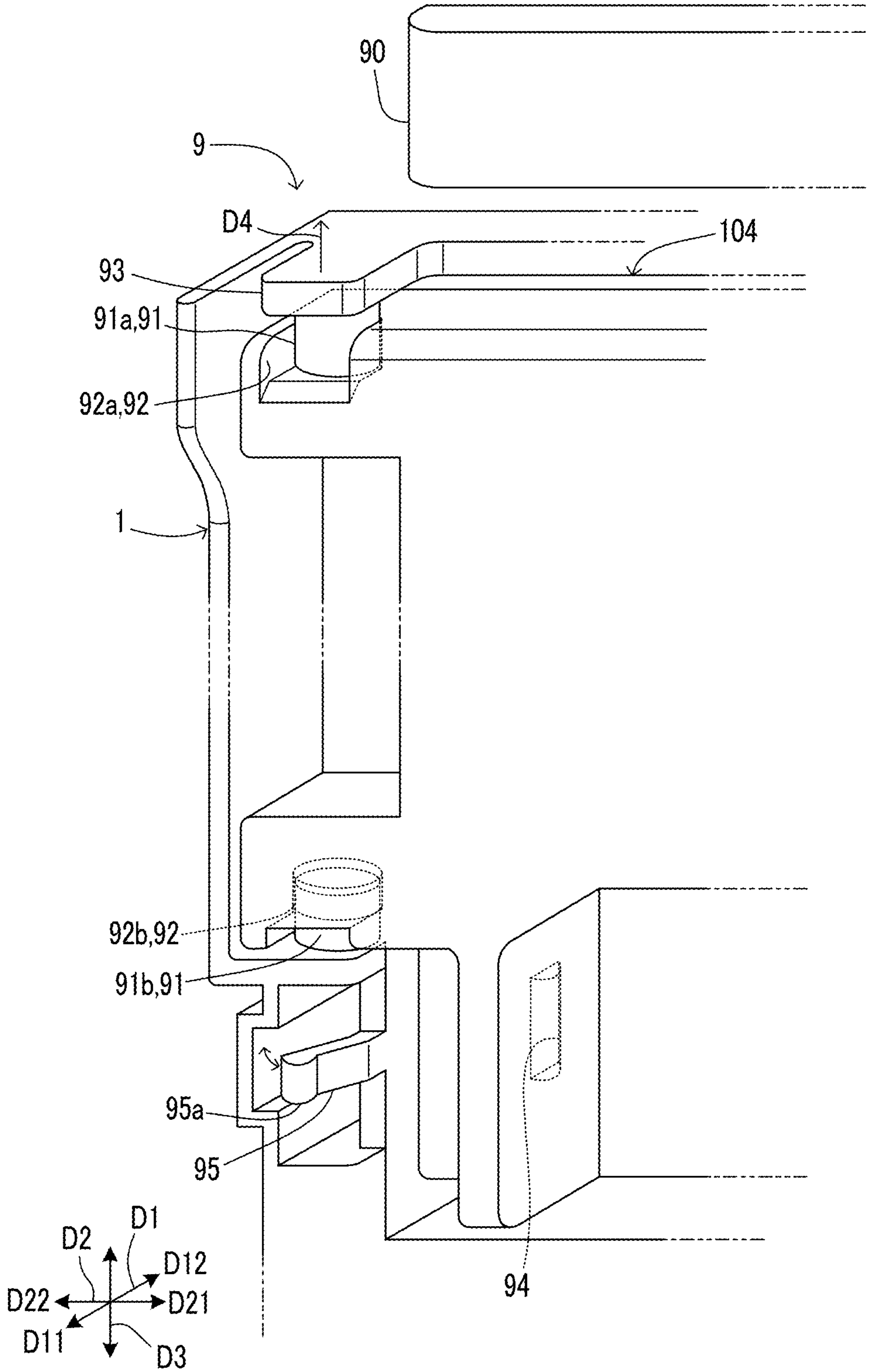
FIG. 14 is a perspective view of the cover supporting mechanism in the image forming apparatus according to the embodiment with a restricting member detached.

In this embodiment, the cover supporting mechanism 9 includes an elastic portion 93, a restricting member 90, the spindle portion 91, and a bearing portion 92 (see FIGS. 13 and 14).

The elastic portion 93 is provided on the body 1 and is elastically deformable in a specific direction D4 (see FIG. 14). The specific direction D4 is a direction along the pivot center line of the second cover 104. In this embodiment, the elastic portion 93 is formed on the upper side of the second cover 104 and the specific direction D4 is the upper direction. It is to be noted that the elastic portion 93 may be formed on the lower side of the second cover 104. In this case, the specific direction D4 is the down direction.

The restricting member 90 is detachably attached to the body 1. Attached to the body 1, the restricting member 90 restricts the deformation of the elastic portion 93 in the specific direction D4. For example, the restricting member 90 is attached to the body 1 by an unillustrated screw.

FIG. 13 shows that the restricting member 90 is attached to the body 1 and FIG. 14 shows that the restricting member 90 is detached from the body 1.

The spindle portion 91 includes a first spindle portion 91*a* formed on the elastic portion 93 and a second spindle portion 91*b* formed on a portion of the body 1 other than the elastic portion 93. The first spindle portion 91*a* and the second spindle portion 91*b* are each formed to protrude along the specific direction D4. That is, the first spindle portion 91*a* and the second spindle portion 91*b* are each formed to protrude along the pivot center line of the second cover 104.

The first spindle portion 91*a* is formed to protrude downward from the elastic portion 93. The second spindle portion 91*b* is formed to protrude upward from the portion of the body 1 other than the elastic portion 93.

The bearing portion 92 includes a first bearing portion 92*a* corresponding to the first spindle portion 91*a* and a second bearing portion 92*b* corresponding to the second spindle portion 91*b*. The first spindle portion 91*a* and the second spindle portion 91*b* are each formed on the second cover 104.

The first bearing portion 92*a* is formed to have a recessed shape into which the first spindle portion 91*a* is fitted. The second bearing portion 92*b* is formed to have a recessed shape into which the second spindle portion 91*b* is fitted.

The elastic portion 93 is deformable in the specific direction D4 with the restricting member 90 detached from the body 1 to cause the first spindle portion 91*a* to come off the first bearing portion 92*a*.

It is easy to mount the second cover 104 on the cover supporting mechanism 9 and detach the second cover 104 from the cover supporting mechanism 9 with the restricting member 90 detached from the body 1. In addition, the restricting member 90 is attached to the body 1 to prevent the second cover 104 from coming off the cover supporting mechanism 9.

In this embodiment, the second cover 104 includes a third engagement portion 94 included in part of the cover supporting mechanism 9 (see FIGS. 13 and 14).

The cover supporting mechanism 9 further includes the third engagement portion 94 formed on the second cover 104 and a fourth engagement portion 95 formed on the body 1 (see FIGS. 13 and 14).

The fourth engagement portion 95 extends from an edge of the second opening 102 in the body 1. This allows the fourth engagement portion 95 to be elastically deformed.

The third engagement portion 94 is engaged with the fourth engagement portion 95 of the body 1 when the second cover 104 is located at the open position. That is, the fourth engagement portion 95 is engaged with the third engagement portion 94 of the second cover 104 when the second cover 104 is located at the open position.

In this embodiment, the third engagement portion 94 has a recessed shape into which a front end 95*a* of the fourth engagement portion 95 is fitted. The fourth engagement portion 95 is engaged with the third engagement portion 94 to hold the second cover 104 at the open position.

In contrast, when force received by the second cover 104 in the direction of the closed position exceeds predetermined retentive force, the fourth engagement portion 95 is elastically deformed to disengage the third engagement portion 94 and the fourth engagement portion 95. As a result, the fourth engagement portion 95 no longer holds the second cover 104 and the second cover 104 is moved toward the closed position from the open position.

The action of the third engagement portion 94 and the fourth engagement portion 95 prevents the fixing unit 5*b* from being caught in the inner projecting portion 61 of the second cover 104 when the fixing unit 5*b* is drawn out of the body 1.

MODIFICATION EXAMPLES

In the image forming apparatus 10, the whole of the fixing device 5 including the fixing unit 5*b* may be drawable from the inside of the body 1 through the second opening 102.

In the latch mechanism 6 of the image forming apparatus 10, the slide surface 61*b* may be formed on the movable member 62 and the contact portion 62*b* may be formed on the inner projecting portion 61 of the second cover 104.

In the cover supporting mechanism 9 of the image forming apparatus 10, the spindle portion 91 may be formed on the second cover 104 and the bearing portion 92 may be formed on the body 1. In this case, the first spindle portion 91*a* is formed on the second cover 104 and the first bearing portion 92*a* is formed on the elastic portion 93 of the body 1.

Supplementary Notes of Invention

The gist of the invention extracted from the embodiment described above will be supplementarily noted below. It is to be noted that the respective configurations and the respective processing functions described in the following supplementary notes can be sorted out and used in any combination.

Supplementary Note 1

An image forming apparatus including:

a body having a side surface on which a drawing opening is formed;

a fixing unit disposed in the body, the fixing unit including a fixing member configured to heat a toner image on a sheet conveyed in the body, the fixing unit being drawable from the body along a first direction through the drawing opening;

a drawing port cover configured to close the drawing opening, the drawing port cover including a first engagement portion configured to be engaged with a member in the body;

a cover supporting mechanism configured to support the drawing port cover to allow the drawing port cover to pivot between a closed position at which the drawing opening is closed and an open position at which the drawing opening is opened;

a movable member disposed so as to be movable in the body along a second direction crossing the first direction, the movable member including a second engagement portion configured to be engaged with the first engagement portion at a reference position in the second direction when the drawing port cover is closed, the movable member being configured to disengage the second engagement portion and the first engagement portion at a retraction position in the second direction;

a second-direction biasing member configured to bias the movable member toward the reference position along the second direction; and a first-direction biasing member disposed on an inner surface of the drawing port cover or a surface of the fixing unit opposed to the drawing port cover, the first-direction biasing member being configured to bias the fixing unit to part of the body to hold the fixing unit at a mounting position in the first direction when the drawing port cover is closed, in which one of the movable member and the drawing port cover has a slide surface inclined with respect to the first direction, another of the movable member and the drawing port cover includes a contact portion that comes into contact with the slide surface when the drawing port cover is closed, the movable member is moved from the reference position to the retraction position against biasing force of the first-direction biasing member by force applied by the contact portion sliding on the slide surface in a process of movement of the drawing port cover from the open position to the closed position, and when the drawing port cover is located at the closed position, the contact portion and the slide surface get out of contact, and the movable member is held at the reference position by the biasing force of the first-direction biasing member and the drawing port cover is held at the closed position by engagement between the first engagement portion and the second engagement portion.

Supplementary Note 2

The image forming apparatus according to Supplementary Note 1, in which the drawing port cover includes a third engagement portion configured to be engaged with part of the body when the drawing port cover is located at the open position, the body is elastically deformable and includes a fourth engagement portion configured to be engaged with the third engagement portion when the drawing port cover is located at the open position, and when force received by the drawing port cover in a direction of the closed position exceeds predetermined retentive force, the fourth engagement portion is elastically deformed to disengage the third engagement portion and the fourth engagement portion.

Supplementary Note 3

The image forming apparatus according to Supplementary Note 2, in which the first engagement portion is formed on a projecting portion that projects to inside of the body from a portion of the drawing port cover that closes the drawing opening.

Supplementary Note 4

The image forming apparatus according to any one of Supplementary Notes 1 to 3, in which the cover supporting mechanism includes an elastic portion provided on the body, the elastic portion being elastically deformable in a specific direction along a pivot center line of the drawing port cover, a restricting member configured to be detachably attached to the body and restrict deformation of the elastic portion in the specific direction, a spindle portion formed on one of the drawing port cover and the elastic portion to protrude along the specific direction, and a bearing portion formed on another of the drawing port cover and the elastic portion to have a recessed shape into which the spindle portion is fitted, and the elastic portion is deformable in the specific direction with the restricting member detached from the body to cause the spindle portion to come off the bearing portion.

Supplementary Note 5

The image forming apparatus according to any one of Supplementary Notes 1 to 4, including a specific cover configured to allow a specific opening to be opened and closed, the specific opening being formed on a side surface of the body different from the side surface on which the drawing opening is formed, in which the movable member is disposed at a position accessible from the specific opening in the body.

Supplementary Note 6

The image forming apparatus according to any one of Supplementary Notes 1 to 5, including:

a heater configured to heat the fixing member; and a switch configured to electrically disconnect a power supply line for the heater by the specific cover being opened, and make the power supply line electrically conductive by the specific cover being closed.

Supplementary Note 7

The image forming apparatus according to any one of Supplementary Notes 1 to 6, further including a first-direction biasing member disposed on an inner surface of the drawing port cover or a surface of the fixing unit opposed to the drawing port cover, the first-direction biasing member being configured to bias the fixing unit to part of the body to hold the fixing unit at a mounting position in the first direction when the drawing port cover is closed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a body having a side surface on which a drawing opening is formed;

a fixing unit disposed in the body, the fixing unit including a fixing member configured to heat a toner image on a sheet conveyed in the body, the fixing unit being drawable from the body along a first direction through the drawing opening;

a drawing port cover configured to close the drawing opening, the drawing port cover including a first engagement portion configured to be engaged with a member in the body;

a cover supporting mechanism configured to support the drawing port cover to allow the drawing port cover to pivot between a closed position at which the drawing opening is closed and an open position at which the drawing opening is opened;

a movable member disposed so as to be movable in the body along a second direction crossing the first direction, the movable member including a second engagement portion configured to be engaged with the first engagement portion at a reference position in the second direction when the drawing port cover is closed, the movable member being configured to disengage the second engagement portion and the first engagement portion at a retraction position in the second direction; and a second-direction biasing member configured to bias the movable member toward the reference position along the second direction, wherein one of the movable member and the drawing port cover has a slide surface inclined with respect to the first direction, another of the movable member and the drawing port cover includes a contact portion that comes into contact with the slide surface when the drawing port cover is closed, the movable member is moved from the reference position to the retraction position against biasing force of the second-direction biasing member by force applied by the contact portion sliding on the slide surface in a process of movement of the drawing port cover from the open position to the closed position, and when the drawing port cover is located at the closed position, the contact portion and the slide surface get out of contact, and the movable member is held at the reference position by the biasing force of the second-direction biasing member and the drawing port cover is held at the closed position by engagement between the first engagement portion and the second engagement portion.

2. The image forming apparatus according to claim 1, wherein the drawing port cover includes a third engagement portion configured to be engaged with part of the body when the drawing port cover is located at the open position, the body is elastically deformable and includes a fourth engagement portion configured to be engaged with the third engagement portion when the drawing port cover is located at the open position, and when force received by the drawing port cover in a direction of the closed position exceeds predetermined retentive force, the fourth engagement portion is elastically deformed to disengage the third engagement portion and the fourth engagement portion.

3. The image forming apparatus according to claim 2, wherein the first engagement portion is formed on a projecting portion that projects to inside of the body from a portion of the drawing port cover that closes the drawing opening.

4. The image forming apparatus according to claim 1, wherein the cover supporting mechanism includes an elastic portion provided on the body, the elastic portion being elastically deformable in a specific direction along a pivot center line of the drawing port cover, a restricting member configured to be detachably attached to the body and restrict deformation of the elastic portion in the specific direction, a spindle portion formed on one of the drawing port cover and the elastic portion to protrude along the specific direction, and a bearing portion formed on another of the drawing port cover and the elastic portion to have a recessed shape into which the spindle portion is fitted, and the elastic portion is deformable in the specific direction with the restricting member detached from the body to cause the spindle portion to come off the bearing portion.

5. The image forming apparatus according to claim 1, comprising a specific cover configured to allow a specific opening to be opened and closed, the specific opening being formed on a side surface of the body different from the side surface on which the drawing opening is formed, wherein the movable member is disposed at a position accessible from the specific opening in the body.

6. The image forming apparatus according to claim 1, comprising:

a specific cover configured to allow a specific opening to be opened and closed;

a heater configured to heat the fixing member; and a switch configured to electrically disconnect a power supply line for the heater by the specific cover being opened, and make the power supply line electrically conductive by the specific cover being closed.

7. The image forming apparatus according to claim 1, further comprising a first-direction biasing member disposed on an inner surface of the drawing port cover or a surface of the fixing unit opposed to the drawing port cover, the first-direction biasing member being configured to bias the fixing unit to part of the body to hold the fixing unit at a mounting position in the first direction when the drawing port cover is closed.

* * * * *